(12) United States Patent
Schroeder

(10) Patent No.: US 8,734,745 B2
(45) Date of Patent: May 27, 2014

(54) AMMONIA INJECTION SYSTEM FOR AN HRSG

(71) Applicant: Nooter/Eriksen, Inc., Fenton, MO (US)

(72) Inventor: Joseph E. Schroeder, Union, MO (US)

(73) Assignee: Nooter/Eriksen, Inc., Fenton, MO (US)

( * ) Notice: Subject to any disclaimer, the term of this patent is extended or adjusted under 35 U.S.C. 154(b) by 0 days.

(21) Appl. No.: 13/963,588

(22) Filed: Aug. 9, 2013

(65) Prior Publication Data

US 2014/0044634 A1 Feb. 13, 2014

Related U.S. Application Data

(60) Provisional application No. 61/681,947, filed on Aug. 10, 2012.

(51) Int. Cl.
  *B01D 53/56* (2006.01)
  *F22B 37/00* (2006.01)
(52) U.S. Cl.
  USPC ........................................ 423/239.1; 122/7 R
(58) Field of Classification Search
  USPC ........................................ 423/239.1; 122/7 R
  See application file for complete search history.

(56) References Cited

U.S. PATENT DOCUMENTS

| 8,220,274 B2 * | 7/2012 | Bono et al. ..................... 60/772 |
| 2001/0000094 A1 * | 4/2001 | Shimada et al. ............... 122/7 R |
| 2011/0041783 A1 * | 2/2011 | Bruckner ...................... 122/7 R |

* cited by examiner

*Primary Examiner* — Timothy Vanoy
(74) *Attorney, Agent, or Firm* — Polster Lieder Woodruff & Lucchesi, L.C.

(57) ABSTRACT

A heat recovery steam generator includes a casing for receiving exhaust gas from a turbine, a heat exchanger positioned within the casing for thermal communication with the exhaust gas, and an ammonia vapor distributor positioned within the casing. An ammonia vaporization unit is configured for conversion of aqueous ammonia to ammonia vapor and communication of the ammonia vapor to the distributor. A first extraction line operatively connects between the casing and the ammonia vaporization unit for communication of exhaust gas to the ammonia vaporization unit. A second extraction operatively connects between the casing and the ammonia vaporization unit for communication of exhaust gas to the ammonia vaporization unit. A catalytic reduction system is located within the casing and positioned downstream from the distributor for effecting a reaction between the ammonia vapor and $NO_x$ in the exhaust gas.

12 Claims, 1 Drawing Sheet

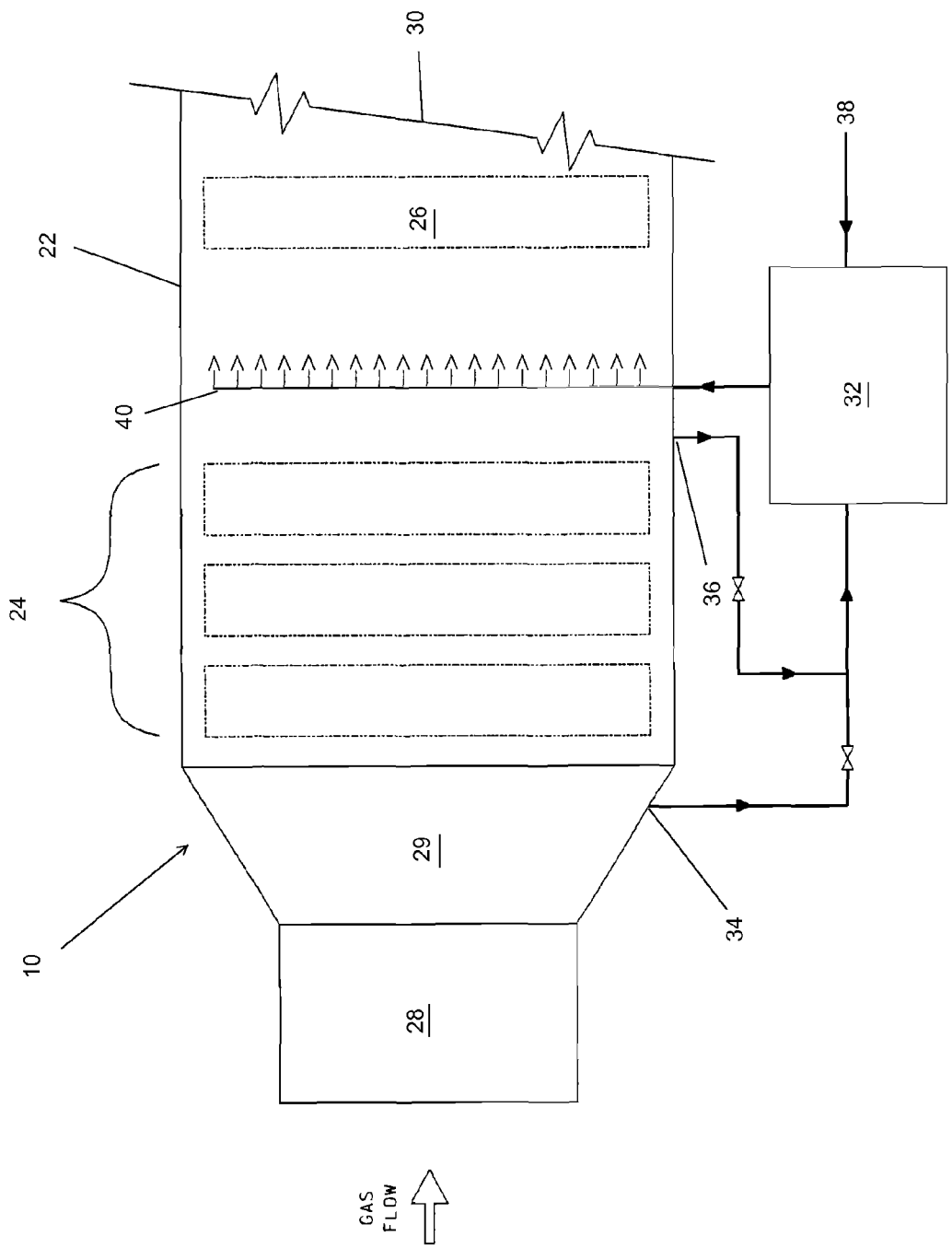

AMMONIA INJECTION SYSTEM FOR AN HRSG

CROSS-REFERENCE TO RELATED APPLICATIONS

This Non-Provisional application claims priority to U.S. Provisional Application Ser. No. 61/681,947 filed Aug. 10, 2012, and which is incorporated herein by reference.

STATEMENT REGARDING FEDERALLY SPONSORED RESEARCH

Not Applicable.

BACKGROUND

This invention relates to heat recovery steam generators (HRSG), and more particular to a HRSG with an ammonia injection system.

Natural gas and to a lesser extent fuel oil are the sources of much of the electrical energy consumed today. Combined cycle power plants convert those fuels into electrical energy in a highly efficient manner. There are three major components in a combined cycle power plant: a combustion turbine/ electrical generator, a Heat Recovery Steam Generator (HRSG), and a steam turbine/electrical generator. Basically, the fuel, whether it is natural gas or oil, burns within the combustion turbine, and the turbine drives an electrical generator that produces some of the electrical energy furnished by the plant. The combustion turbine also discharges exhaust gas at elevated temperatures often exceeding 1000° F. The exhaust gas flows through the HRSG which extracts heat from it to convert subcooled water into superheated steam that flows into the steam turbine, which in turn drives another electrical generator that produces more electricity.

The typical HRSG has a casing into which the exhaust gas from the combustion turbine discharges and within the casing a succession of heat exchanges for extracting heat from the exhaust gas and transferring it to water flowing through the heat exchanges in various phases: subcooled, saturated, and superheated. The heat exchangers take the form of coil sections. Many HRSGs have a selective catalytic reduction (SCR) system located in the casing between two of the heat exchangers where the temperature of the exhaust gas is best suited for its operation. The SCR system controls the oxides of nitrogen ($NO_x$) emissions emitted to atmosphere from the HRSG stack at the downstream end of the casing. For the $NO_x$ catalyst to function, ammonia must be injected into the exhaust stream. The ammonia and $NO_x$ are converted in the presence of the catalyst to nitrogen and water vapor. Ammonia is generally delivered to plant sites diluted with water for safer handling. The diluted ammonia is called aqueous ammonia. Prior to injection into the HRSG, the aqueous ammonia is vaporized by mixing it with a hot carrier gas. The carrier gas also provides dilution of the ammonia, and it is then introduced into the exhaust gas flowing through HRSG through a series of distributors. The carrier gas can be electrically heated air or it can be extracted with a high temperature combustion turbine exhaust gas. When the combustion turbine exhaust gas is used, it is extracted from the HRSG very close to and upstream of the point of reinjection at the distributor so as to reduce overall heat loss from the HRSG and, thus, not penalize the HRSG steam production efficiency. This extracted exhaust gas temperature must be above ~450° F. before the aqueous ammonia flow can be established.

DESCRIPTION OF THE DRAWINGS

In the accompanying drawings which form part of the specification:

FIG. 1 is a schematic view showing a heat recovery steam generator ("HRSG") with an ammonia vaporization system.

Corresponding reference numerals indicate corresponding parts throughout the several figures of the drawings.

DETAILED DESCRIPTION

The following detailed description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

As seen in the schematic of FIG. 1, generally a heat recovery steam generator ("HRSG") 10 includes a casing 22 and a succession of coils or heat exchangers 24, and a selective catalytic reduction (SCR) system 26 located in the casing 22. In addition, the HRSG 10 includes pumps, valves, and lines or conduits (not shown) connecting the heat exchangers, pumps and valves together into the functioning HRSG 10. Hot gases, typically the discharge from a gas turbine, enter the casing 22 at an inlet 28, typically between 900° F. and 1200° F., pass through the heat exchangers, which extract heat from it, and discharge through an outlet 30.

An ammonia vaporization system 32 operatively connects between a supply of aqueous ammonia 38 and the casing 22. The ammonia vaporization system 32 is preferably a direct contact heat exchanger. However, any suitable type of ammonia vaporization system can be used. For a faster startup, the ammonia vaporization system 32 connects to the casing 22 at two extraction points: a first extraction point 36 for use during normal operation, and a second extraction point 34 for use during startup. The first extraction point 36 is preferably positioned after the heat exchangers 24. The second extraction point 34 is preferably positioned in an inlet transition 29, which is generally the area between the inlet 28 and the heat exchangers 24. The ammonia vaporization system 32 vaporizes the aqueous ammonia 38. The vaporization system 32 communicates the ammonia vapor to a distributor 40 positioned within the casing 22 between the heat exchangers 24 and the SCR system 26. The distributor 40 is configured to inject the ammonia vapor into the gas stream within the casing 22 so that the ammonia vapor interacts with the SCR system 26. The distributor is preferably a series of parallel pipes with holes across the entire exhaust gas path. However, any suitable type of distributor can be used.

At startup, exhaust will be initially extracted from the second extraction point 34 where the turbine exhaust temperature is higher because it is upstream of any heat exchangers. Using this hotter exhaust allows the ammonia flow to the SCR system 26 to be established quicker and at a higher flow rate such that the SCR 26 could be fully saturated with ammonia quicker. This reduces the time for plant $NO_x$ emissions to come into compliance, and also reduces overall $NO_x$ emissions for the combined cycle power plant operating cycle. $NO_x$ is defined as mono-nitrogen oxides, including NO nitric oxide and $NO_2$ nitrogen dioxide. When the exhaust temperature at the normal extraction point exceeds 450° F., valves within the extraction piping are adjusted to extract all carrier gas flow from the normal extraction point.

In an alternative embodiment, the ammonia vaporization system could be oversized or a startup electric heater installed to provide ammonia vaporization at a higher ammonia flow rate than required for normal operation.

Changes can be made in the above constructions without departing from the scope of the disclosure, it is intended that all matter contained in the above description or shown in the accompanying drawings shall be interpreted as illustrative and not in a limiting sense.

What is claimed is:

1. A heat recovery steam generator, comprising:
   a casing for receiving exhaust gas from a turbine;
   at least one heat exchanger positioned within the casing for thermal communication with the exhaust gas;
   an ammonia vapor distributor positioned within the casing;
   an ammonia vaporization unit configured for conversion of aqueous ammonia to ammonia vapor and communication of the ammonia vapor to the distributor;
   a first extraction line operatively connected between the casing and the ammonia vaporization unit for communication of exhaust gas to the ammonia vaporization unit;
   a second extraction operatively connected between the casing and the ammonia vaporization unit for communication of exhaust gas to the ammonia vaporization unit;
   a catalytic reduction system located within the casing and positioned downstream from the distributor for effecting a reaction between the ammonia vapor and $NO_x$ in the exhaust gas.

2. The heat recovery steam generator of claim 1, wherein the first extraction line operatively connects to the casing downstream of the heat exchangers.

3. The heat recovery steam generator of claim 1, wherein the second extraction line operatively connects to the casing upstream of the heat exchangers.

4. The heat recovery steam generator of claim 1, wherein the second extraction line communicates exhaust gas to the ammonia vaporization at a higher temperature than the temperature of the exhaust gas communicated to the ammonia vaporization unit by the first extraction line.

5. The heat recovery steam generator of claim 1, wherein the distributor is located downstream of the heat exchangers.

6. The heat recovery steam generator of claim 1, wherein the distributor is located between two of the heat exchangers.

7. A method of reducing $NO_x$ from an exhaust gas flowing in a heat recovery steam generator having a casing, a heat exchanger within the casing, a distributor positioned within the casing, a catalytic reduction system located within the casing, and an ammonia vaporization system, comprising the steps of:
   communicating the exhaust gas to an inlet of the casing and through the casing to an outlet;
   communicating a supply of aqueous ammonia to the ammonia vaporization system;
   communicating exhaust gas from a first extraction point of the casing to the ammonia vaporization system;
   communicating exhaust gas from a second extraction point of the casing to the ammonia vaporization system;
   vaporizing the aqueous ammonia into ammonia vapor with the ammonia vaporization system;
   communicating ammonia vapor from the ammonia vaporization system to the distributor;
   communication of the ammonia vapor from the distributor to the catalytic reduction system to effect a reaction between the ammonia vapor and $NO_x$ in the exhaust gas.

8. The method of claim 7, wherein the first extraction line operatively connects to the casing downstream of the heat exchangers.

9. The method of claim 7, wherein the second extraction line operatively connects to the casing upstream of the heat exchangers.

10. The method of claim 7, wherein the second extraction line communicates exhaust gas to the ammonia vaporization at a higher temperature than the temperature of the exhaust gas communicated to the ammonia vaporization unit by the first extraction line.

11. The method of claim 7, wherein the distributor is located downstream of the heat exchangers.

12. The method of claim 7, wherein the distributor is located between two of the heat exchangers.

* * * * *